S. W. FRANCIS.
Combined Knives, Forks, and Spoons.

No. 147,119.  Patented Feb. 3, 1874.

Witnesses
Ewell Dick
W. E. Chaffee

Inventor.
Saml. W. Francis
by atty Pollok

AM. PHOTO-LITHOGRAPHIC CO. N.Y. (OSBORNE'S PROCESS)

UNITED STATES PATENT OFFICE.

SAMUEL W. FRANCIS, OF NEWPORT, RHODE ISLAND.

IMPROVEMENT IN COMBINED KNIVES, FORKS, AND SPOONS.

Specification forming part of Letters Patent No. 147,119, dated February 3, 1874; application filed January 22, 1874.

*To all whom it may concern:*

Be it known that I, SAMUEL W. FRANCIS, of Newport, Rhode Island, have invented a new and Improved Combined Knife, Fork, and Spoon, of which the following is a specification:

The object of this invention is to combine in a convenient manner, in one implement, a knife, fork, and spoon. To this end I group the several elements closely together, using the bowl of the spoon as the central element, around or upon which the remaining elements are placed. I form the knife on one edge of the spoon-bowl, while the fork-tines are placed at the front end of said bowl. With the bowl is connected a handle of any suitable configuration.

In the accompanying drawing I have represented the manner in which my invention is or may be carried into effect.

Figure 1:
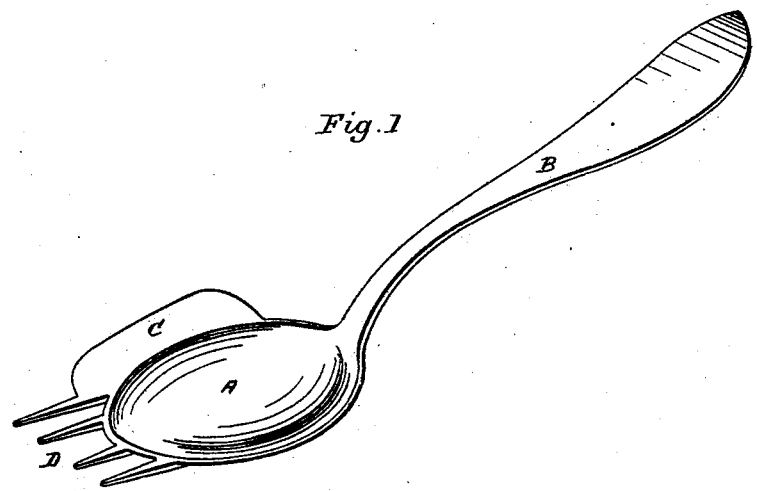
Figure 2:
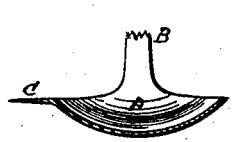

Figure 1 is a perspective view of the combined knife, fork, and spoon. Fig. 2 is a transverse section through the bowl of the spoon.

A is the bowl of the spoon, and B the handle, of any ordinary or suitable configuration. On one edge of the bowl I form a knife blade or edge, C, which may occupy more or less of the length of the bowl, and can have any suitable outline. Projecting from the front of the bowl are tines D, which constitute the fork. The three elements are thus grouped together most compactly, constituting an article which can be very conveniently used for many purposes.

It will, of course, be understood that the pattern or special configuration of the article can be varied, according to taste or the demands of the market. This is a matter discretionary with the manufacturer, and does not affect my invention so long as the grouping of the elements in the manner shown is maintained. The implement can be struck up in one piece from sheet metal, or may be made in any other suitable way.

What I claim, and desire to secure by Letters Patent, is—

As a new article of manufacture, a combined knife, fork, and spoon, in which the knife is formed upon the edge of the spoon-bowl, and the fork-tines upon the end thereof, as herein shown and described.

In testimony whereof I have hereunto signed my name this 19th day of January, A. D. 1874.

SAML. W. FRANCIS.

Witnesses:
WM. P. CLARKE,
E. J. CAHOON.